INVENTOR.
WILLIAM R. FOOTE
BY
HIS ATTORNEY

Jan. 20, 1959        W. R. FOOTE        2,869,324

GAS TURBINE POWER-PLANT CYCLE WITH WATER EVAPORATION

Filed Nov. 26, 1956        2 Sheets-Sheet 2

INVENTOR.
WILLIAM R. FOOTE
BY
HIS ATTORNEY

United States Patent Office 2,869,324
Patented Jan. 20, 1959

2,869,324

GAS TURBINE POWER-PLANT CYCLE WITH WATER EVAPORATION

William R. Foote, Ballston Lake, N. Y., assignor to General Electric Company, a corporation of New York Application November 26, 1956, Serial No. 624,340

4 Claims. (Cl. 60—39.59)

My invention relates to gas turbine powerplants, and more particularly to gas turbine powerplants operating on water injection cycles.

By injection of water into the conventional gas turbine cycle, the efficiency and the available power output of the cycle are increased. It is desirable to realize a maximum available gain in both powerplant efficiency and power output. One way to accomplish this result is to evaporate a maximum theoretical amount of water in the evaporator. However, a perfect evaporator is restricted in the amount of water it can evaporate by the fact that the heat to evaporate this water must come from the heat of the air entering the evaporator. The present invention provides a method of increasing the heat available in the evaporator for evaporating water.

It is an object of my invention to provide a gas turbine powerplant with an improved water evaporation system.

A further object of my invention is to improve the thermal efficiency of a gas turbine powerplant.

A further object of my invention is to improve the power output of a gas turbine powerplant.

Other objects and advantages will become apparent from the following description, and the features of novelty which characterize my invention will be pointed out with particularity in the claims appended to this specification.

Briefly stated, in accordance with one aspect of my invention, in a water injection gas turbine cycle I provide a method and apparatus for increasing the thermal energy available in the compressed air for evaporating water by supplying additional heat to the compressed air before it enters the evaporator.

The nature of the invention will best be understood when described in connection with the accompanying drawings, in which.

Figure 1:
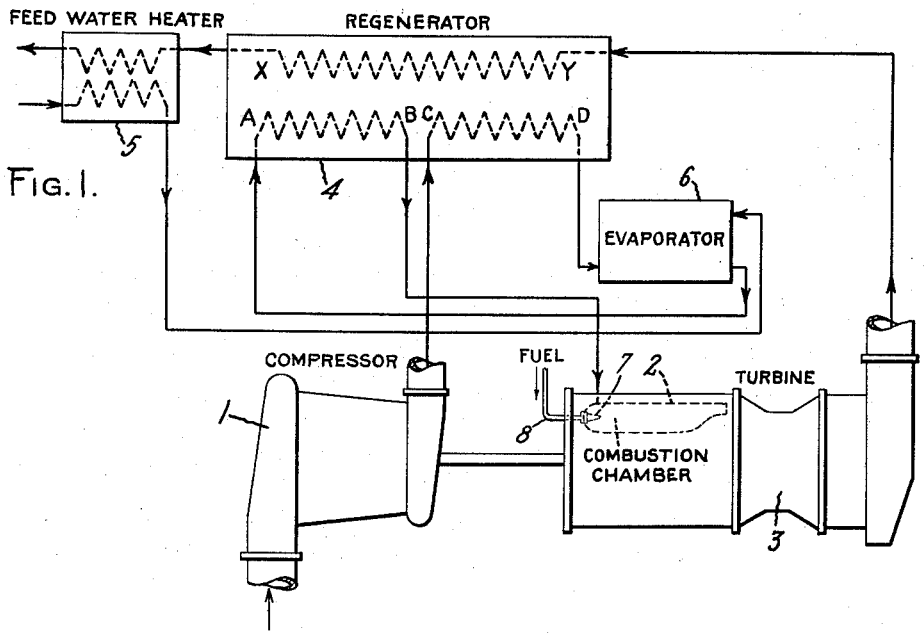
Fig. 1 shows diagrammatically a gas turbine powerplant which incorporates my invention.

Referring now to Fig. 1, there is shown a gas turbine powerplant wherein the compressor 1 compresses an elastic fluid such as air to serve as motive fluid of the cycle. Heat is supplied to the compressed air in the combustion chamber 2 and then the compressed air is expanded in the gas turbine 3. A regenerator or air preheater 4 is arranged to recover some of the available heat in the exhaust gases leaving the turbine, and a feed water heater 5 is arranged to further utilize the remaining available heat in the turbine exhaust gases. An evaporator 6 is arranged to add water to the compressed air before it enters the combustion chamber.

Air can be compressed substantially adiabatically in the compressor 1, thus permitting the use of a simple multi-stage axial flow, centrifugal, "spiraxial" or "mixed flow" compressor. As the quantity of water which can be evaporated in the evaporator 6 is dependent upon the quantity of heat in the compressed air entering the evaporator, means are provided to supply additional heat to the compressed air in the regenerator before the air reaches the evaporator. Feed water, after being first heated in the feed water heater 5 by passing it in heat exchange relation with the relatively hot exhaust gases from the gas turbine, is injected into the evaporator 6. Here the water is vaporized into steam by the heat available in the compressed air. A steam content approximately equivalent to between 7% and 13% of the weight flow of air can be utilized. After the addition of the steam to the compressed air, the compressed air and vaporized steam mixture first passes in further heat exchanging relation with the exhaust gases of the gas turbine in the regenerator 4 and then is conducted to the combustion chamber 2 where additional heat is supplied by the burning of fuel. Appropriate fuel is supplied to the fuel nozzle 7 by a conduit 8; however, any other suitable heat source may be employed. The heated mixture is then expanded in the gas turbine 3.

The compressed air in the evaporator 6 is cooled by the vaporization of the water, so that a favorable heat exchange condition will exist in the regenerator between the compressed air and vaporized steam relative to the exhaust gases from the gas turbine, as will be seen from the following. The heat generated by compression of the air and acquired by the passage of the compressed air through the regenerator before passing it through the evaporator is not lost, since this thermal energy is represented by the vaporized water in the motive fluid. By this cooling of the compressed air prior to heating it in the regenerator, considerably more heat can be recovered from the exhaust gases in the regenerator and returned to the system than would otherwise be recovered without such pre-cooling of the compressed air.

Figure 2:
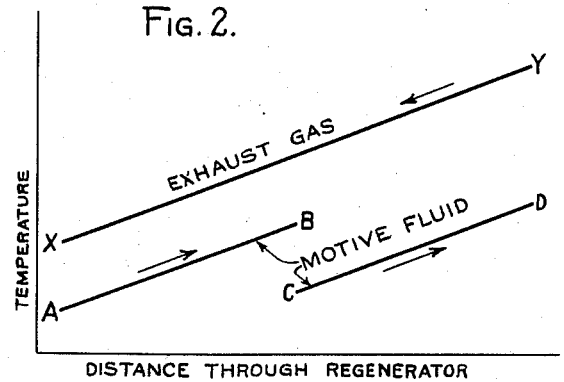
Fig. 2 shows a graphic representation of the approximate heat transfer through the regenerator.

Fig. 2 shows graphically the temperature differential which exists in the regenerator. The gas turbine exhaust gases enter the regenerator at condition Y and leave the regenerator at condition X. The heated fluids pass in counterflow direction, the compressed air being heated (prior to being passed into the evaporator) enters the regenerator at C and leaves the regenerator at D. The air and steam mixture being heated (prior to passing to the combustion chamber) enters the regenerator at A and leaves at B. It will be apparent that, with this arrangement, there tends to be a generally constant temperature differential between the compressed air passing from C to D, relative to the hot gas temperature, which falls from Y towards X, and a somewhat smaller, but also generally constant differential between the temperature of the fluid being heated from A to B relative to the exhaust gas temperature. This relation tends to improve the efficiency of the heat transfer process in the regenerator 4.

Figure 3:
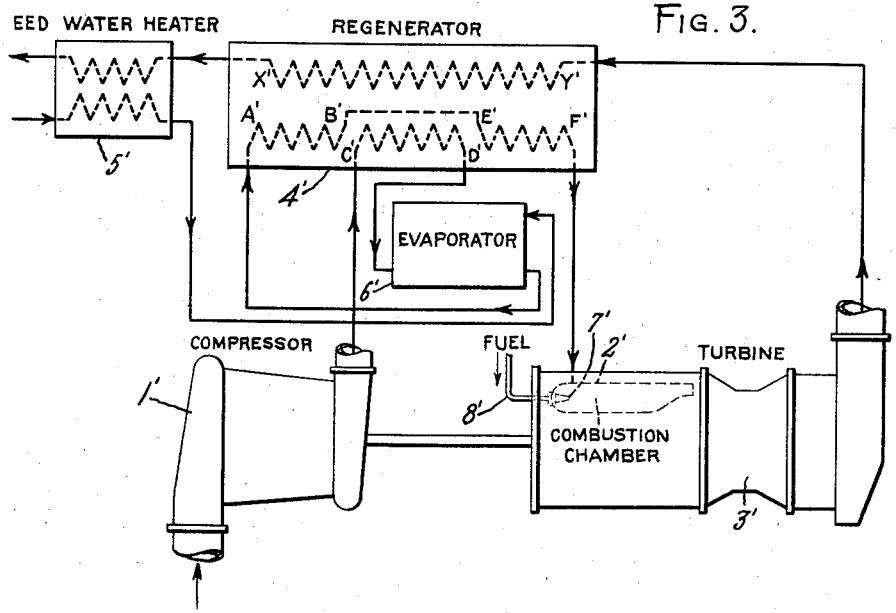
Fig. 3 shows a gas turbine powerplant which incorporates a modification of my invention.
Figure 4:
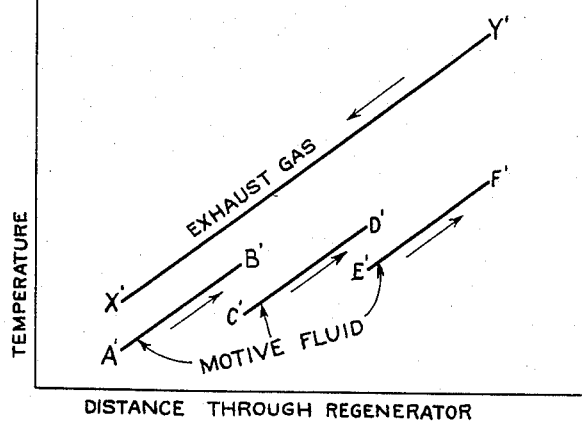
Fig. 4 represents graphically the approximate heat transfer through the regenerator of the gas turbine powerplant illustrated in Fig. 3.

A modification of the invention is shown diagrammatically in Fig. 3, and the heat transfer process which occurs in the regenerator is represented in Fig. 4. The compressed air, before entering the evaporator 6', enters the regenerator 4' in the middle of the regenerator as shown by line C'D' in Fig. 4, and travels in a counterflow direction with the gas turbine exhaust gases Y'X'. The compressed air and vaporized steam leaving the evaporator flows in a counter-flow direction in the regenerator, entering the regenerator at A', Figs. 3 and 4 and being discharged from the regenerator at B', then reintroduced into the regenerator 4' at E and discharged at F, then passed to the combustion chamber 2' where additional heat is supplied by the burning of fuel, and then passes to the gas turbine 3'.

The actual selection of the modification disclosed in Fig. 3 over the arrangement disclosed in Fig. 1 may be partially dictated by the temperature available. By way of illustration, assume that the gas turbine exhaust gases enter the regenerator 4' at Y' at a temperature of 950° F., and leave at X' at a temperature of 300° F. It is, of course, desirable to obtain the maximum temperature drop of the exhaust gases in the regenerator. The compressed air leaving the compressor may be at 500° F. and the compressed air may be cooled to 250° F. in the evaporator by the injection of water. If the compressed air leaving the compressor were passed in heat exchanging relation with the low temperature side of the regenerator, no heat could be recovered by it. Furthermore, as it is thermodynamically desirable that the temperature of the fluid supplied to the combustion chamber be at a maximum, it is necessary that this fluid pass in heat exchanging relation with the hot end of the regenerator. The compressed air, after leaving the compressor, is therefore passed through the center of the regenerator.

The advantage of the cycle incorporating my invention is that additional power, possibly on the order of 75 to 100% of the output without use of the invention, is available from the additional water evaporated. Also, this water injection produces a significant gain, possibly in the nature of 15%, in overall thermal efficiency of the cycle. Further, the regenerator is made to operate at a higher mean temperature difference, resulting in improved efficiency of heat transfer in the regenerator. These important advantages are attainable by the addition of only simple heat exchangers and a reasonable amount of additional piping. Further, by compressing adiabatically, a compressor of a simple type without intercoolers, may be employed since the heat of compression is not wasted but is effectively used in the evaporator.

While I have described only certain preferred embodiments of my invention by way of illustration, many modifications will occur to those skilled in the art. For instance, other heat recovery devices can be added. Also, water may be injected directly into the compressor to effect "direct-contact intercooling," or heat exchangers for interstage cooling may be employed with the compressor, or reheaters may be employed with the gas turbine, or the feed water may be used for intercooling the compressor or for other cooling purposes, before going to the evaporator 6. I intend in the appended claims to cover all such modifications as fall within the true spirit and scope of my invention.

What I claim as new and desire to secure by Letters Patent of the United States is:

1. A gas turbine powerplant comprising a turbine, a combustion system, a compressor compressing air to form the motive fluid to be expanded in the turbine, a first heat exchanger utilizing the heat in the exhaust gases of the turbine, means for conducting the compressed air to the heat exchanger so as to pass the compressed air in heat exchanging relationship with the exhaust gases from the turbine and in a counterflow direction to the exhaust gases from the turbine, an evaporator, means for conveying the compressed air from the first heat exchanger to the evaporator, means for injecting water into the air in the evaporator so as to vaporize the injected water to form an air-water vapor mixture, means for conducting the mixture to the first heat exchanger so as to pass it in heat exchanging relationship with exhaust gases of the turbine, the exhaust gases of the turbine passing in a counterflow direction to the mixture after the gas turbine exhaust gases have been passed in heat exchanging relationship with the compressed air, means for conducting the mixture to the combustion system so as to supply heat to the mixture by burning fuel therein and means to conduct the resulting heated mixture to the gas turbine for expansion in the gas turbine.

2. A gas turbine powerplant comprising a turbine, a combustion system, a compressor compressing air to form the motive fluid which is expanded in the turbine, a first heat exchanger connected to utilize the heat of the exhaust gases of the turbine, means for conducting the compressed air to the heat exchanger so as to pass it in heat exchanging relationship with the exhaust gases from the turbine, an evaporator, means for conveying the compressed air from the first heat exchanger to the evaporator, means for injecting water into the compressed air in the evaporator so as to vaporize the injected water to form an air-water vapor mixture, means for conducting the mixture to the combustion system so as to supply heat to the mixture by burning fuel therein, and means to conduct the resulting heated mixture to the gas turbine for expansion in the gas turbine.

3. In a gas turbine powerplant having a compressor, a combustion system, and a turbine, the combination of a heat exchanger for recovering waste heat from the turbine exhaust gas, an evaporator, means for injecting water into the compressed air in the evaporator so as to vaporize water to form an air-water vapor-mixture, said heat exchanger having at least three heating sections including a first section connected to heat the air-water vapor mixture immediately before it passes to the combustion system, a second section connected to receive compressed air from the compressor and heat it immediately before passing to the evaporator, and a third section connected to receive air-water vapor mixture from the evaporator and to heat it before passing it to said first heat exchanger section, the exhaust gas from the turbine passing through said heat exchanger first in counterflow heat transfer relation relative to said first heat exchanger section, then in counterflow relation relative to said second heat exchanger section, then in counterflow relation to said third heat exchanger section.

4. In a gas turbine powerplant having a compressor, a combustion system, and a turbine, all connected so the compressor furnishes motive fluid under pressure which is heated in the combustion chamber and expanded in the turbine, the combination of heat exchanger means including at least first and second heat exchangers heated by spent motive fluid exhausted from the turbine, evaporator means for adding water vapor to the compressed air discharged from the compressor, one of said heat exchangers being connected to add heat from the turbine exhaust gas to the compressed air discharged from the compressor before it enters the evaporator, the other of said heat exchangers being connected to transfer thermal energy from the turbine exhaust gases to the air-water vapor mixture discharged from the evaporator, and conduit means supplying air-vapor mixture from the second heat exchanger to the combustion system, whereby the first heat exchanger increases the capability of the evaporator for adding water to the motive fluid.

References Cited in the file of this patent

UNITED STATES PATENTS

| | | |
|---|---|---|
| 1,069,694 | Hayot | Aug. 12, 1913 |
| 2,115,112 | Lysholm | Apr. 26, 1938 |
| 2,115,338 | Lysholm | Apr. 26, 1938 |
| 2,186,706 | Martinka | Jan. 9, 1940 |